UNITED STATES PATENT OFFICE.

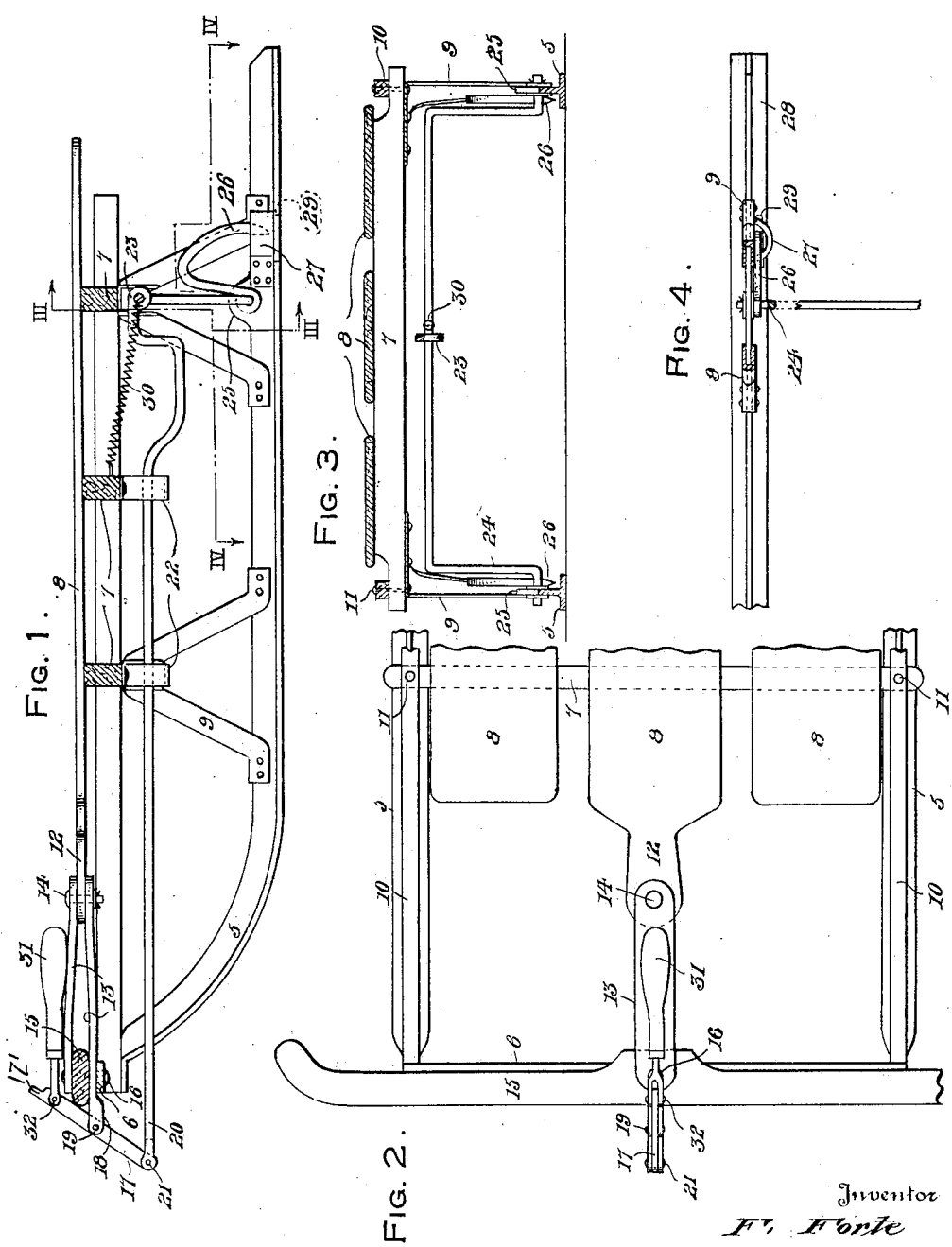

FRANK FORTE, OF TENAFLY, NEW JERSEY.

SLED-BRAKE.

1,371,155. Specification of Letters Patent. Patented Mar. 8, 1921.

Application filed May 20, 1920. Serial No. 382,950.

*To all whom it may concern:*

Be it known that I, FRANK FORTE, a citizen of the United States of America, residing at Tenafly, in the county of Bergen and State of New Jersey, have invented certain new and useful Improvements in Sled-Brakes, of which the following is a specification.

This invention relates to certain new and useful improvements in sled brakes and has more particular reference to an improved attachment for hand steered hand sleds of the flexible steerable type, whereby the occupant may readily control the traveling movement of the sled when desired.

With the above object in view and others that will become apparent as the nature of the invention is better understood, the same consists in the novel form, combination and arrangement of parts hereinafter more fully described, shown in the accompanying drawing and claimed.

In the drawing, wherein like reference characters designate corresponding parts throughout the several views, Figure 1 is a longitudinal sectional view of a sled equipped with a brake constructed in accordance with the present invention, Fig. 2 is a fragmentary top plan view of the forward end of the device shown in Fig. 1, Fig. 3 is a vertical sectional view taken substantially upon line III—III of Fig. 1, and Fig. 4 is a horizontal sectional view taken substantially upon line IV—IV of Fig. 1.

Referring more in detail to the several views, the present invention contemplates the provision of a brake attachment for the usual form of flexible occupant steered sled embodying runners 5 connected at their forward ends by means of a transverse bar 6 and rearwardly of said bar 6 by means of and rearwardly of said bar 6 by means of bolsters 7 which support the longitudinal platform strips 8, suitable brackets 9 being provided to support the bolsters 7 in the required spaced relation to the runners 5. Longitudinal side rods 10 are also provided in this form of sled pivotally connected as at 11 to the bolsters 7 and similarly connected at their forward ends to the bar 6. The central platform bar 8 has a forward extension 12 to which the rear ends of a pair of links 13 are pivotally attached as at 14, a transverse steering handle 15 being disposed above the bar 6 and between the forward ends of the pair of links 13 with a bolt 16 extending through the steering handle 15, links 13 and bar 6 whereby swinging of the handle 15 will cause flexing of the sled so as to advance one runner ahead of the other and thereby cause steering of the sled in the usual manner.

The construction thus far described is well known in the art and does not form any part of the present invention. The present invention contemplates a brake attachment particularly serviceable in connection with this form of sled, and includes a straight lever 17 pivoted intermediate its ends to an extension 18 as at 19, the extension 18 being provided upon the forward end of the lower link 13 whereby the lever 17 may swing in a vertical plane forwardly of the bar 6 and steering handle 15. The lower end of the lever 7 terminates in a horizontal plane below the bolsters 7, and has the forward end of a push rod 20 pivoted thereto as at 21, the push rod 20 being arranged longitudinally and substantially centrally of the sled. The push rod 20 extends rearwardly through suitable guide straps 22 provided on the undersides of the two forward bolsters 7, and terminates, in its normal position beneath the rearmost bolster 7 in an eye 23 which pivotally encircles the normally vertically disposed crank of a crank shaft 24. The crank shaft 24 has its opposite ends outwardly directed into suitable bearings 25 which are preferably integral with and project upwardly from the runners 5 as clearly shown in Figs 1 and 3, whereby the crank shaft is journaled for rotation on horizontal axes transversely of the sled and at the rear of the latter. Adjacent the runners 5 and upon the horizontal end portions of the crank shaft 24 are rigidly fixed a pair of hook-shaped brake members 26, each of which has a downwardly projecting pointed end portion extending rearwardly of the crank shaft whereby, when the latter is rotated by pushing the rod 20 rearwardly, said brake members are caused to move downwardly and engage the ground for stopping movement of the sled in an obvious manner. Suitable guide and guard plates 27 are fastened upon the runners 5 for protecting the pointed ends of the brake members 26, and the inner flanges 28 of the runners are provided with slots 29 so as to allow the brake members to pass into engagement with the ground.

The brake members 26 are retained in their normal inoperative positions by means of a suitable tension spring 30 which is preferably fastened at one end to the intermediate bolster 7 and at its other end to the crank of the crank shaft 24. A handle 31 is disposed to rest upon the upper link 13 and has its forward end pivotally connected as at 32 with the upper end of the lever 17 whereby the occupant of the sled may readily push forwardly upon the handle for rocking the lever 17 so as to cause rearward movement of the push rod 20 for moving the brake members into operative engagement with the ground against the action of the spring 30. The lever 17 is provided with a longitudinally projecting stop lug 17' upon its upper end arranged in the path of the handle 31 so as to prevent the latter from swinging forwardly beyond a plane wherein the lever 17 and the handle 31 are longitudinally alined, thus insuring against movement of the handle 31 out of operative position or reach of the occupant of the sled.

In the use of the sled, the occupant assumes a position upon the sled in the usual manner practised when coasting, and should he desire to bring the sled to a stop, he grasps the handle 31 in one hand and pushes forwardly thereon so as to rock the lever 17 upon the pivot 19 whereby a rearward sliding movement of the push rod 20 is obtained. When this takes place the crank shaft 24 is rotated in a direction to cause downward movement of the brake members or spurs 26 until they forcibly engage the surface over which the sled is traveling, and by penetrating said surface, the members 26 bring the sled to a stop.

From the foregoing description it is believed that the construction and operation of the present invention will be readily understood and the practical nature thereof appreciated by those skilled in the art.

Minor changes may be made without departing from the spirit and scope of the invention as claimed.

What is claimed as new is:—

In combination with a flexible occupant-steered sled including a pair of runners connected at their forward ends by a transverse bar and having a steering handle arranged transversely of the sled above said bar, and a pair of links connecting the platform of said sled with said bar and steering handle, of a forward extension upon one of said links, a lever vertically disposed at the forward end of the sled and pivotally connected intermediate its ends to said extension, a handle resting upon the other link and pivotally connected to the upper end of said lever, a push rod arranged beneath the platform of the sled longitudinally of the latter and pivotally connected at its forward end to the lower end of said lever, and brake elements operatively connected to said push rod.

In testimony where I affix my signature.

FRANK FORTE.